(No Model.)
H. DALWIGK.
MEANS FOR CHECKING OR STOPPING HORSES.
No. 590,658. Patented Sept. 28, 1897.
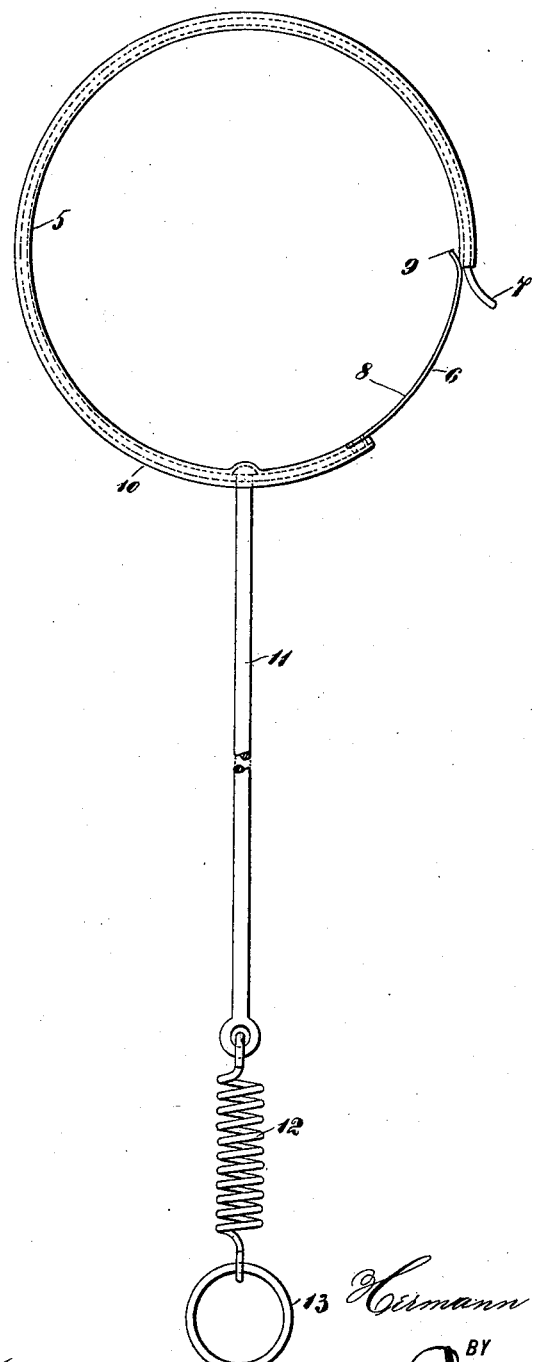
WITNESSES
INVENTOR
Hermann Dalwigk.
BY
Edgar Tate
ATTORNEYS.

UNITED STATES PATENT OFFICE.

HERMANN DALWIGK, OF WEST HOBOKEN, NEW JERSEY, ASSIGNOR OF ONE-FOURTH TO ANDREW J. METER AND ALVIN O. ARNOLD, OF NEW YORK, N. Y.

MEANS FOR CHECKING OR STOPPING HORSES.

SPECIFICATION forming part of Letters Patent No. 590,658, dated September 28, 1897.

Application filed September 17, 1896. Serial No. 606,140. (No model.)

*To all whom it may concern:*

Be it known that I, HERMANN DALWIGK, a citizen of the United States, and a resident of West Hoboken, in the county of Hudson and State of New Jersey, have invented certain new and useful Improvements in Means for Checking or Stopping Horses, of which the following is a specification, reference being had to the accompanying drawing, forming a part thereof, in which similar numerals of reference indicate corresponding parts.

This invention relates to means for checking or stopping a horse or horses when hitched to a buggy, carriage, or other vehicle; and the object thereof is to provide a simple and effective device of this class by means of which a horse or horses when hitched to a carriage, buggy, or other light vehicle may be quickly and easily stopped when moving at any gait or attempting to run away, said device being also adapted to serve as means for hitching a horse or horses.

The invention is fully disclosed in the following specification, of which the accompanying drawing forms a part, said drawing being a side view of my improved device.

In the practice of my invention I provide an open ring 5, which is composed of strong spring-steel and open at one side, as shown at 6, one end thereof being preferably curved outwardly, as shown at 7, and the ring 5 is provided at one side of the opening therein with a spring 8, which is secured thereto and which projects across said opening and the end of which is preferably curved inwardly, as shown at 9, and the body portion of said ring is preferably provided with a covering 10, of leather, canvas, or other suitable material.

Secured to one side of the ring 5 is a handle 11, which consists of a steel or other suitable rod and which may be of any desired length, and to the outer end of which is secured a spiral spring 12, to the free end of which is secured a ring 13.

In practice the ring 6 is connected with the end of the lines or said lines are connected with said ring, and this connection may be a permanent one, if desired, and whenever it is desired to hitch, check, or stop a horse or horses all that is necessary is to grasp the device by the handle 11 and connect the open ring 5 with one of the wheels of the vehicle, preferably one of the wheels connected with the rear axle, the tire and rim of the wheel being passed through the opening at 6. The spring 8 will prevent the tire and rim of the wheel from leaving the ring, and as the wheel revolves the ring will be drawn downwardly and backwardly, and with it the lines, and the horse or horses will be quickly brought to a stop or brought to a stand if moving or attempting to run.

This device is also well adapted, as will be understood, to serve as means for hitching a team, and it will be understood that when the ring 5 is connected with the wheel, as above described, any attempt to pull the vehicle will result in drawing the lines downwardly and backwardly, and the entire weight of said vehicle will be drawn, if at all, by the mouth of the horse or horses.

The object of the spring 12 is to relieve any sudden strain or jerk on the mouth of the horse which may be occasioned when the ring 5 is connected with the wheel of the vehicle, and it will thus be seen that I accomplish the object of my invention by means of a device which is simple in construction and perfectly adapted to produce the result for which it is intended, and it will also be understood that changes in and modifications of the construction herein described may be made without departing from the spirit of my invention or sacrificing its advantages.

Having fully described my invention, I claim as new and desire to secure by Letters Patent—

An improved device for stopping horses, comprising an open ring 5, composed of spring-steel provided with an opening 6, one end being curved outwardly as shown at 7, a spring 8 secured to the other end and projecting across said opening, and having the end curved inwardly at 9, said ring being provided with a covering 10 composed of suitable material, said ring being also provided with a handle 11 composed of steel, and provided at the outer end with a spiral spring secured to which is a ring 13, substantially as shown and for the purpose set forth.

In testimony that I claim the foregoing as my invention I have signed my name, in presence of the subscribing witnesses, this 14th day of September, 1896.

HERMANN DALWIGK.

Witnesses:
M. A. KNOWLES,
C. GERST.